United States Patent [19]

Jungpeter et al.

[11] 4,065,838
[45] Jan. 3, 1978

[54] TENTER FRAME CLIP-OPENING WHEEL WITH RESILIENT RIM

[75] Inventors: Raymond R. Jungpeter, Arlon, Belgium; Jean L. Buchholz, Luxembourg, Luxembourg

[73] Assignee: E. I. Du Pont de Nemours and Company, Wilmington, Del.

[21] Appl. No.: 755,724

[22] Filed: Dec. 30, 1976

Related U.S. Application Data

[63] Continuation of Ser. No. 593,018, July 3, 1975, abandoned.

[51] Int. Cl.$^2$ .............................................. D06C 3/04
[52] U.S. Cl. .................................................... 26/94
[58] Field of Search ................... 26/72, 73, 79, 92, 93, 26/94, 95

[56] References Cited

U.S. PATENT DOCUMENTS

| 2,205,749 | 6/1940 | Lacey | 26/94 |
| 2,414,010 | 1/1947 | Baumann | 26/94 |
| 2,574,928 | 11/1951 | Mather | 26/94 |
| 3,551,546 | 12/1970 | Gosper et al. | 26/72 X |

FOREIGN PATENT DOCUMENTS

| 7,175 of | 1892 | United Kingdom | 26/94 |

*Primary Examiner*—Robert R. Mackey

[57] ABSTRACT

A device for opening tenter frame clips mounted on an endless chain carried by a sprocket wheel, including:
 a clip opening wheel rotatable on a common axis with the sprocket wheel, such clip opening wheel having an elastomeric peripheral rim;
 the clips having means including a clamping surface and a pivotable clamping arm for clamping a web of material therebetween, such clamping arm being connected to a clip opening arm for pivoting the clamping arm into its open position; and
 the clip opening arm being adapted to contact the elastomeric peripheral rim of the clip opening wheel as the clips are moved by the chain whereby to open the clips.

The elastomeric rim is of a material, such as polyurethane rubber having a hardness of 95 Shore A, which reduces impact force as the opening arm is moved into contact with the rim, during the opening of the clip.

The rim may be fixedly mounted on the periphery of the wheel. Alternatively, such rim may move freely with respect to such wheel or the wheel may be freely rotatable about such common axis, independently of the sprocket to help spread wear around the full circumference of the wheel.

6 Claims, 4 Drawing Figures

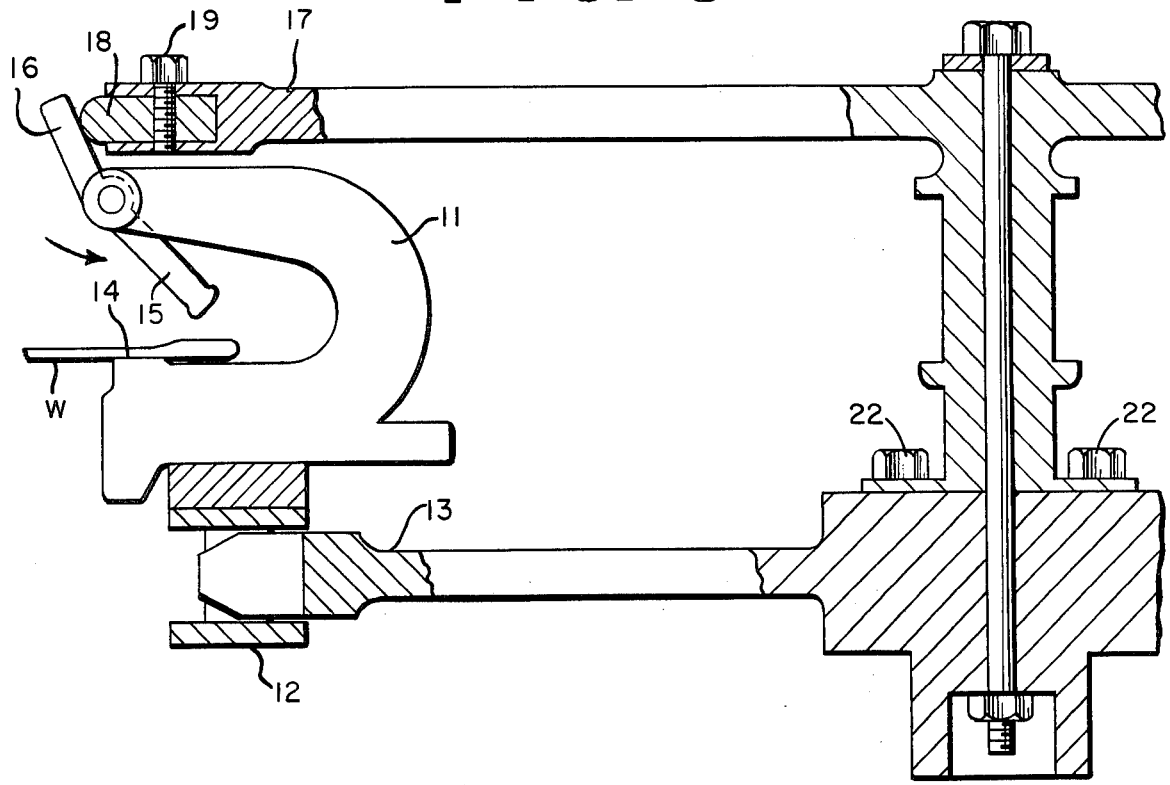
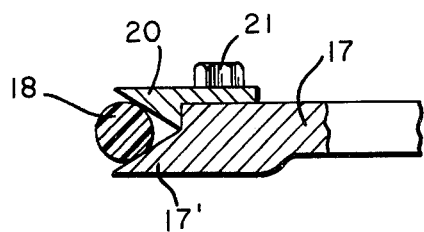

TENTER FRAME CLIP-OPENING WHEEL WITH RESILIENT RIM

This is a continuation of application Ser. No. 593,018, filed July 3, 1975, now abandoned.

BACKGROUND OF THE INVENTION

1. Field of the Invention

The field of art to which this invention pertains is tenter frames in general and, more specifically, it pertains to an improved opening wheel having an elastomeric rim for opening tenter frame clips mounted on an endless chain driven by a sprocket wheel, which clips are opened by moving the chain and, hence, an opening arm of each clip into contact with the opening wheel whereby to open such clip.

2. Description of the Prior Art

It is known, in the tenter frame art, to use an opening wheel as a means to open a tenter frame clip mounted on an endless chain carried by a sprocket wheel. The opening of the clip is brought about by moving the chain and, hence, a clip opening arm connected to the clip into contact with the wheel whereby a pivotable arm of such clip is moved into its open position, thus opening the clip. Typical of the prior art patents teaching the use of opening wheels of the type above described are U.S. Pat. No. 2,147,115 to Williams; U.S. Pat. No. 3,118,212 to Parkinson; U.S. Pat. No. 3,727,273 to Hyatt and U.S. Pat. No. 2,157,644 to Williams. In each of these patents tenter frame clips having a clamping surface and a pivotable arm for clamping a web of material therebetween are shown as being opened by bringing an opening arm of the clip into contact with an opening wheel having a metallic rim.

A problem with the teachings of this art, and with the other known art, is that the impact of the opening arm with the metallic, driven opening wheel is such that the useful life of the clip and of the wheel is greatly reduced. This is so not only because of the metal-to-metal contact but also, since the opening wheel and sprocket are driven together, due to the fact that such impact always occurs at the same location(s) on the rim, rather than being distributed around the rim.

SUMMARY OF THE INVENTION

Briefly summarized, this invention is a device for opening tenter frame clips mounted on an endless chain carried by a sprocket wheel, including:
- a clip opening wheel rotatable on a common axis with the sprocket wheel and having an elastomeric peripheral rim;
- the clips having means including a clamping surface and a pivotable clamping arm for clamping a web of material therebetween, such clamping arm being connected to a clip opening arm for pivoting the clamping arm into its open position; and
- the clip opening arm being adapted to contact the elastomeric peripheral rim of the clip opening wheel as the clips are moved by the chain whereby to open the clips.

In a preferred embodiment of the invention, the elastomeric rim is mounted on the periphery of the wheel so as to move freely with respect thereto or the wheel is freely rotatable about such axis independently of the sprocket, whereby to spread wear around the full circumference of the wheel.

By using such elastomeric rim, which, preferably is polyurethane rubber having a hardness of 95 Shore A, the impact force is reduced as the opening arm is moved into contact with the rim, during the opening of the clip and, unexpectedly, the useful life of both the wheel and of the clips is greatly enhanced. This advantage, together with other improvements in the opening step, gives to the tenter frame art, an effective clip opening means heretofore not available to it.

BRIEF DESCRIPTION OF THE DRAWING

FIG. 3 is an end elevation view, partly in cross-section, of the clip opening device shown in FIG. 1.

FIG. 4 is a cross-sectional view of a part of another embodiment of the device of the present invention, showing a freely-rotating rim in an opening wheel thereof.

DESCRIPTION OF THE INVENTION

Figure 1:
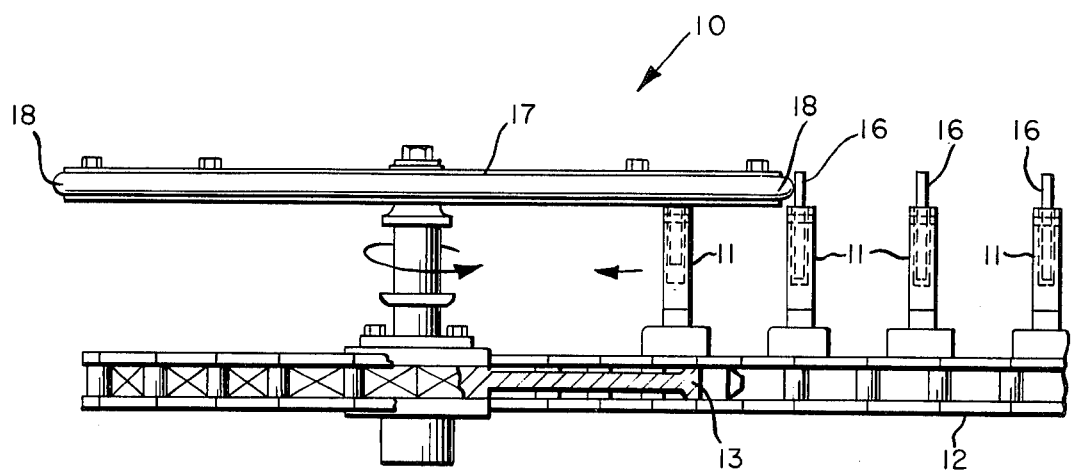
FIG. 1 is a side elevation view, partly in cross-section, of a device, including an opening wheel having an elastomeric rim, for opening tenter frame clips in accordance with the present invention.

This invention is an improved device for opening tenter frame clips, as further will be described in detail.

It is known to use tenter frames in order to stretch webs of plastic films, fabrics, foils, etc., in the direction of their width. A typical tenter frame generally includes a plurality of tenter frame clips mounted on two endless chains and guided by a pair of diverging tracks. The clips are adapted to grip the edges of a web of material, such as polyethylene terephthalate film as it emerges from a machine-direction stretching device. Each track is composed of two rails, an inner guide rail and an outer guide rail. The chains are each adapted to be moved about two or more motor driven members (usually sprockets) while being disposed in guiding contact with the rails of the diverging tracks during their movement. In this way, the clips on the chains serve to move the web longitudinally, while simultaneously stretching the web transversely.

A typical tenter frame clip is shown in U.S. Pat. No. 3,118,212 to Parkinson. Such clip essentially consists of a pivotable clamping arm which swings between an open end and closed position to grip the edge of the web of film between it and a clamping surface.

It will be seen that the center of gravity of the clamping arm is such that it normally rests in its closed position. At the entrance end of the tenter frame, the web moves into the clip and in position between the pivotable arm and clamping surface. The distances are so adjusted that the edge of the web will slip past and under the foot of the clamping arm, so that as the clip moves to the point of divergence of the tracks, the web pulls such arm to the closed position, wedging the film between the arm and the clamping surface. Generally, this action is sufficient to tightly engage the edge of the web and hold it between the pivotable clamping arm and the clamping surface of the clip so that it can withstand the transverse stretching tension, although under some circumstances a positive clip closing device may be used to assure closure.

The clip-opening step at the delivery end of the tenter after the web has been stretched, on the other hand, presents a more difficult problem, since the wedging of the pivotable arm in its closed position is magnified by action of the heat of the tenter oven and the force of stretching.

Prior to the instant invention the clips generally have been opened mechanically by means of a clip opening arm connected to the pivotable arm above its pivot, which clip opening arm is brought into contact, by movement of the chain, with the periphery of a metallic clip-opening wheel mounted on the axis of and driven with the sprocket wheel at the delivery end of the tenter frame.

In part because the clips may be positioned slightly inboard of the chain on which they are mounted, and to deflect the clip opening arm, the clip opening wheel has a diameter larger than the diameter of the sprocket wheel. As a result of this, the clip opening arm comes into contact with the rim of the opening wheel at an angle with respect to the tangent to the wheel with considerable impact. Further, even though it is driven at the same angular velocity, since the diameter of the opening wheel is larger than the sprocket wheel, this causes the peripheral velocity of the rim to be greater, so the clip opening tends to cause the arms to slip on the rim on initial contact and through a short arc until the clamping arm of the clip reaches the position of a radius of the circular paths which, along with the considerable impact, causes excessive rim and clip wear. And, lastly, since the rim of the clip opening wheel is driven by the sprocket wheel, the clip opening arms impact the rim at the same locations on successive revolutions of the rim, creating highly localized additional wear. The total effect is high wear on the rim and on the clip arm caused by the high-force, large-angle initial impact, resulting in wear on the surface of each by sliding as a result of speed differences.

The present invention surprisingly minimizes these difficulties by providing a novel elastomeric rim on the clip opening wheel, as will now be explained.

Referring to the drawing, there is shown a device 10 of this invention for opening tenter frame clips 11 in a novel manner. Such clips 11, as used in tenter frame apparatus of the type as shown, for example, is U.S. Pat. Nos. 3,118,212 and 3,727,273, which patents are incorporated by reference herein, are mounted on an endless chain 12 carried by a sprocket wheel 13, driven by means, not shown, to move the clips 11 through a tenter frame oven, for example. Such clips 11 are formed of a metallic material, such as cast iron or steel, and have means including a clamping surface 14 and a pivotable clamping arm 15 for clamping a web of material W therebetween. The clamping arm 15 is connected to a clip opening arm 16 for pivoting the clamping arm into its open position as shown in FIG. 3, as will now be explained.

Essentially the pivoting of the clamping arm 15 into its open position is brought about by moving the opening arm 16 of each clip 11 into contact with an opening wheel, which opening wheel in the prior art also has been formed of a metallic material, such as steel, in that it was believed that this was the only type material that could withstand the repetitive, extraordinary impact and sliding, twisting forces imposed on the wheel and on the clips during opening.

The present invention has surprisingly found this requirement of all metal parts is not valid and, accordingly, provides an improved means for opening the tenter frame clips 11 above described in the form of a clip opening wheel 17 having a novel elastomeric rim 18 mounted on its periphery, as will further be described in greater detail.

In the opening the clips 11, in accordance with this invention, the sprocket 13 moves the chain 12 and, hence, the clips 11 mounted thereon in a counterclockwise direction as shown in FIG. 1, from right to left, thereby bringing the opening arm 16 into contact with such elastomeric rim 18 of the opening wheel 17 to pivot the clamping arm 15 inwardly in the direction of the arrow whereby to open the clip 11, with little wear on either the clip or the rim, contrary to expectations.

Figure 2:
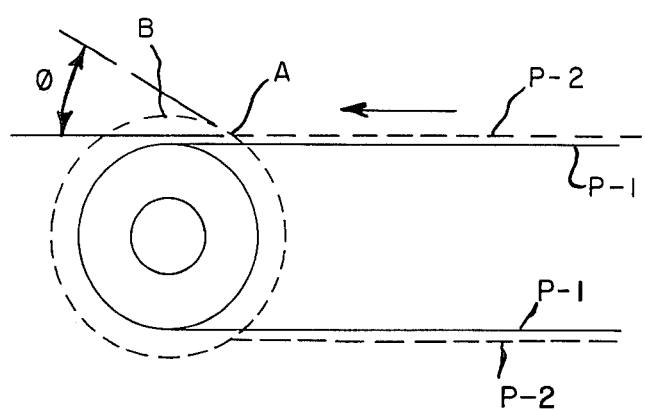
FIG. 2 is a schematic view showing the paths of travel of parts of the clip opening device shown in FIG. 1.

As shown, the opening wheel 17 and the sprocket 13 are mounted for rotation about a common axis and, as explained previously, the diameter of the opening wheel 17 is greater than the diameter of the sprocket wheel 13. The effect of the difference in diameter of the sprocket wheel and the clip opening wheel is shown in FIG. 2. Prior to contact with the elastomeric rim of the clip opening wheel 17, the chain 12 follows path P-1 while the opening arm 16 follows path P-2 until contact is made with the rim, as indicated at A. The abrupt change of direction indicated by the angle $\phi$ results in an impact of the opening arm 16 against the opening wheel 17 and a pivoting deflection in a direction to open the clip as shown in FIG. 3. The difference between the diameter of the sprocket 13 and clip opening wheel 17 results in a difference in the speed of the clip, moving at a speed of the periphery of the sprocket and the speed of the periphery of the clip opening wheel which causes slippage between them in the part of the arc followed by the clip and the clip opening arm. The maximum slippage occurs at the point of impact A. By the time the arm reaches point B on the arcuate path, it is extended radially from the axis of rotation of the wheel so that no slippage occurs.

The problem, then, prior to this invention, has been how to control excessive wear on the rim of the opening wheel and wear of the clip opening arm together with gradual destruction of the clip at its pivot, for example, caused by the considerable impact, and twisting and sliding, at point A, recognizing that such impact was the initial action in opening the clip.

In the case of clip opening devices using metallic opening wheels, it is known this impact is such that the wheel is gouged out at the location at which the opening arm strikes it to the extent that, in a short time, the clip will not open. Further, this impact causes excessive wear and tear on the clip itself, particularly on the clip opening arm and at the pivot. The replacement of the worn wheel, and, particularly, the replacement of the hundreds of damaged clips, is a major item of concern in the tenter frame art.

Logically, it seemed to those skilled in the art that this problem would be magnified if a rubber rim were used on the opening wheel because of the fact that increased friction would be present at the point of impact due to the rubber material. As an example, steel will slide on steel, but not on rubber. Accordingly, because of this, and because of the nature of the material per se, it was believed that a resilient or rubber rim would gouge more easily than steel and, hence, would not work, for this and other reasons. The present invention has shown this is not the case and, in fact, it has been found that by using an elastomeric rim on the opening wheel, according to this invention, unexpected improvements at this important opening stage occur, bringing to the art a means of improving tenter frame operation.

Specifically it has been found that by providing an elastomeric rim 18 on the opening wheel 17 brings about improved wear of both the wheel 17 and the clips 11 which strike the rim to open the clip. Only certain types of elastomeric material will work. Preferably, and specifically, it has been found that a rim 18 made of Feboprene* polyurethane rubber having a hardness of 90 or 95 Shore A provides such improvements. This material is of the proper hardness and has sufficient resistance to high temperatures, which are present in the tenter oven, and other requirements and still gives excellent opening of the clips 11 with little wear.
*Felix Bottcher 5 Kolin 41 - West Germany In the simplest embodiment, rim 18 is fixedly mounted on the periphery of the opening wheel 17 by appropriate means such as cap screw 19, as shown in FIG. 3, for example.

In a preferred embodiment, as shown in FIG. 4, the rim 18 is mounted on the periphery of the opening wheel 17 whereas to be freely rotatable with respect thereto. As shown such rim 18 is fitted into a V-shaped groove on the opening wheel 17 as defined by a lower outermost portion 17' of such wheel and a bracket 20 fixedly secured by a cap screw 21 of the wheel 17. It has been found that upon becoming heated the rim 18 tends to expand whereby it is freely rotatable with respect to the wheel 17. By having this free rotation capability, the impact point of the opening arms 16 on such rim 18 does not occur at the same precise location as is the case when the opening wheel is rotated with the sprocket wheel 13 and the rim 18 is fixedly mounted; hence, wear is spread around the rim 19 and other impact advantages occur thus enhancing the opening step.

Alternatively, means may be provided for accomplishing this wear advantage by having the opening wheel rotate freely about the common axis with the sprocket, but independently of such sprocket. As shown in FIG. 3 this may be brought about by appropriate steps, such as by loosening cap screws 22 whereby the opening wheel 17 is free to move with respect to the sprocket 13. Again, the end result is that the impact of the opening arms against the rim 18 due to the freely rotating sprocket nature of wheel 17 spreads the wear around the wheel and lessens the impact on the clips somewhat, whereby the lifespan of both the rim and the clips are increased.

As has been mentioned previously, replacement of the metal rim of the driven clip-opening wheel with an elastomeric rim might be expected to cushion the impact of the metal opening arms of the tenter clips with the rim, but certain inherent properties of the elastomer-metal interaction cast doubt on the practicability of such use of an elastomer. The most apparent method of application would be to fixedly attach an elastomeric rim on the wheel, such as an elastomeric tire-like structure, held in place by a metal ring secured to the wheel by capscrews, still resulting in identical angular velocities, but differing linear speeds of the rim and spocket. Doubt arises from the inherent frictional drag of the elastomer on the metal, not only resulting from the different relative motion of the two elements with resistance to sliding caused by the elastomer, but also in the twisting of the lever arm as the angle of contact between the two changes as the rim moves in its arcuate path while the tenter clip is still following a straight line path. Under the high initial clip-opening pressure, this skidding, twisting action would tend to abrade or gouge out the elastomer, result in a short life and free small particles which could be carried to the surface of the web, causing contamination. This latter difficulty is of considerable concern in polyester film destined for magnetic tape, in which film is handled in subsequent steps under "white-room" conditions.

Early tests with a fixed elastomeric rim on a driven clip-opening wheel indeed revealed a high rate of wear and supported earlier doubts with regard to the practicability of the concept. Continued use, however, revealed that the surface of the elastomer became glazed, and the rate of wear was stabilized and reduced to a small fraction of its initial rate. The source of the glazing has not been positively identified, but it is believed to be from small quantities of oil, and volatile matter collecting on the elastomer. For this use it was found necessary to have an oil resistant elastomer serviceable at high temperatures and of a Shore A hardness of about 95, as provided by polyurethane rubbers, as can be custom fabricated by firms such as Goodyear Tire and Rubber Co., Akron, Ohio.

Although the low wear and replacement of the rim is a significant feature of this invention, more important from the standpoint of cost is the relatively insignificant wear on and improvement of life of the tenter clips. Replacement of these clips involves disassembly of the tenter chain and the time-consuming operation of replacing what is usually several hundred clips. A further, and increasingly significant feature is noise abatement, an occupational hazard of which industry is becoming very much aware. Noise levels are reduced to less than 50% the level upon opening clips with metal-rimmed, clip-opening wheels.

While the fixedly mounted elastomeric rims on clip-opening wheels, coaxial with and driven by the sprockets, in general perform satisfactorily, a preferred embodiment is a coextensive elastomeric rim free to rotate with respect to the sprocket, wherein the point of impact of the clip lever is randomized as a result of a slow creep of the rim with respect to the sprocket. This embodiment reduces wear of the elastomer to barely detectable levels after extended periods of use. In all cases, however, wear is reduced over the metal rim and, thus, improvements are realized by using elastomeric rims, in accordance with this invention.

We claim:

1. Means for opening a tenter frame web clamping device including:
    a tenter clip having an opening arm;
    an opening wheel having a pre-glazed by use, oil-resistant, elastomer rim mounted on its periphery; and
    means to move the opening arm into contact with the elastomeric rim to open the web clamping device and,
    wherein the elastomeric rim is of polyurethane rubber having a hardness of at least about 90 Shore A and is fixedly mounted on the periphery of the opening wheel whereby inpact force as the opening arm is moved into contact with the rim is reduced and rate of wear of such rim is stabilized.

2. A device for opening tenter frame clips, such clips being mounted on an endless chain carried by a sprocket wheel and having means including a clamping surface and a pivotable clamping arm for clamping a web of material therebetween, such clamping arm being connected to a clip opening arm for pivoting the clamping arm into its open position, the improvement comprising:

a clip opening wheel rotatable on a common axis with the sprocket wheel and having a pre-glazed by use, oil-resistant, elastomeric peripheral rim of polyurethane rubber having a hardness of at least about 90 Short A adapted to rotate independently of the sprocket wheel, and such clip opening arm being adapted to contact the elastomeric peripheral rim of the clip opening wheel as the tenter frame clips are moved by the chain to open the tenter frame clips whereby impact force as the opening arm is moved into contact with the rim is reduced and rate of wear of such rim is stabilized.

3. A web handling apparatus including:

a plurality of web clamping devices in a tenter frame mounted on a movable chain carried by a sprocket mounted for rotation about an axis, each clamping device including a clamping surface and a pivotable clamping part, such pivotable clamping part being connected to a clamping device opening arm;

an opening wheel having a glazed by use, oil-resistant, elastomeric rim of polyurethane rubber having a hardness of at least about 90 Shore A mounted on the periphery thereof; and means for moving the chain such that the opening arm contacts the elastomeric rim thereby moving the pivotable clamping part into its open position whereby impact force as the opening arm is moved into contact with the rim is reduced and rate of wear of such rim is stabilized.

4. The apparatus of claim 3 wherein the elastomeric rim is fixedly mounted on the periphery of the wheel.

5. The apparatus of claim 3 wherein the sprocket is rotated about the axis to move the chain and wherein the wheel is freely rotatable about such axis, independently of such sprocket.

6. The apparatus of claim 3 wherein the diameter of the opening wheel is greater than the diameter of the sprocket wheel.

* * * * *